(12) United States Patent
Park et al.

(10) Patent No.: US 8,236,909 B2
(45) Date of Patent: Aug. 7, 2012

(54) METHOD FOR PREPARING POLYMER BY PRECIPITATION POLYMERIZATION

(75) Inventors: Seung-Young Park, Daejeon (KR); Sung-Cheol Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/312,859

(22) PCT Filed: Dec. 5, 2007

(86) PCT No.: PCT/KR2007/006278
§ 371 (c)(1),
(2), (4) Date: May 29, 2009

(87) PCT Pub. No.: WO2008/069568
PCT Pub. Date: Jun. 12, 2008

(65) Prior Publication Data
US 2010/0004412 A1    Jan. 7, 2010

(30) Foreign Application Priority Data

Dec. 5, 2006 (KR) .................. 10-2006-0122527

(51) Int. Cl.
*C08F 4/54* (2006.01)
(52) U.S. Cl. ........................................ 526/134
(58) Field of Classification Search ............ 526/134
See application file for complete search history.

(56) References Cited

U.S. PATENT DOCUMENTS

| 5,015,708 | A | | 5/1991 | Shih et al. |
| 6,121,383 | A | * | 9/2000 | Abdou-Sabet et al. ....... 525/192 |
| 6,500,906 | B1 | * | 12/2002 | Kong et al. ............. 526/124.2 |
| 7,312,285 | B2 | * | 12/2007 | Chun et al. ................ 526/171 |
| 2005/0043541 | A1 | * | 2/2005 | Walter et al. ................ 548/101 |

FOREIGN PATENT DOCUMENTS

JP        01-190709        7/1989

OTHER PUBLICATIONS

Macromol. Rapid Commun. 20, 511-514 (1999).
Bioresource Technology 54 (1995) 5-16.
Nicell et al. "Phenol Polymerization and precipitation by horseradish peroxidase enzyme and an additive", Bioresource Technology, vol. 54, Issue 1, p. 5-16, (1995).

* cited by examiner

*Primary Examiner* — Rebecca Anderson
*Assistant Examiner* — Sonya Wright
(74) *Attorney, Agent, or Firm* — McKenna Long & Aldridge LLP

(57) ABSTRACT

The present invention provides a method for preparing a polymer by precipitation polymerization, comprising the steps of mixing an antisolvent a), a monomer b), and a catalyst c), and while polymerizing the monomers, simultaneously precipitating a polymer formed by the monomers b) in a solid phase.

10 Claims, No Drawings

METHOD FOR PREPARING POLYMER BY PRECIPITATION POLYMERIZATION

TECHNICAL FIELD

The present invention relates to a method for preparing polymer by precipitation polymerization, in which a synthesized polymer is precipitated in a solid phase during homogeneous liquid phase polymerization, and its particle size grows with time, thereby obtaining solid particles of polymer after reaction is finished.

This application claims priority from International Application No. PCT/KR2007/006278 filed on Dec. 5, 2007, which claims priority from Korean Patent Application No. 10-2006-122527 filed on Dec. 5, 2006 in the KIPO, the disclosure of which are incorporated herein by reference in its entirety.

BACKGROUND ART

In the information and electronics industries, demands for new materials showing higher functionality with elements of smaller size is increasing over inorganic materials such as silicon oxide and silicon nitride which have been generally used so far.

As a material capable of satisfying the requirement of higher functionality, polymers have been drawing great interests due to their excellent properties including low dielectric constant and moisture absorption, excellent adhesion to metal, strength, thermal stability and transparency, and a high glass transition temperature (Tg>250° C.).

The polymers having above-mentioned properties can be used as insulating films of semiconductor or TFT-LCD, protective films of polarizing plates, and electronic components such as multichip modules, integrated circuit (IC), printed circuit board, encapsulants for electronic materials, and flat panel displays.

Cyclic olefin-based polymers which are composed of cyclic monomers such as norbornenes exhibit much better properties than conventional olefin-based polymers, showing higher transparency, better heat and chemical resistance, and lower bi-refringence and moisture absorption. Thus, they can be used for various applications, e.g., optical components such as CDs, DVDs and POFs (plastic optical fibers), information and electronic components such as capacitor films and low-dielectrics, and medical components such as low-absorbent syringes, blister packaging, etc.

Since cyclic olefin-based polymers can be used in such various applications, many studies have been extensively conducted on their commercial applications in academic and industrial fields.

The preparation methods of catalysts with high activity have been mostly studied, but there have been comparatively few studies on the polymerization and post-treatment process that is advantageous in commercial scale from an economic viewpoint.

Until now, a solution polymerization method has been generally used to prepare cyclic olefin-based polymers. The solution polymerization is typically performed by mixing catalyst and monomer in a solvent such as toluene at a predetermined temperature, thus both of monomer and synthesized polymer are dissolved in the solvent and maintained as a single liquid phase during the entire reaction time.

As the conversion increases, the concentration of the polymer in the solution is gradually increased, and the viscosity of the solution is thereby increased. From the initial stage of the reaction to the end, phase separation or phase conversion does not occur during the reaction, and the polymerization reaction is completed in a single homogeneous liquid phase. In other words, when the polymerization is completed or even during the reaction the polymers obtained by the polymerization are completely dissolved in the solvent.

After the polymerization is completed, a dropwise addition method using an antisolvent such as alcohol (methanol, ethanol, etc.), hexane, and cyclohexane is performed in order to precipitate and recover the polymers dissolved in the solvent.

Antisolvent means an organic liquid solvent that is miscible with the solvent of polymer solution but does not dissolve the desired cyclic olefin-based polymer to be separated.

As for the dropwise addition method, there is a method of slowly adding the antisolvent dropwise to the polymerization solution and a method of slowly adding the polymerization solution dropwise to the antisolvent (reverse).

The cyclic olefin-based polymers can be prepared using any one of the methods, which is selected by considering the properties of the polymer and polymerization solution, and properties of the formed particles.

In this step, the kind of antisolvent to be used is also important in the precipitation by the dropwise addition.

Examples of the antisolvent generally used include at least one alcohol-based solvent selected from methanol and ethanol, at least one nonpolar solvent selected from normal hexane, cyclohexane and heptane, and acetone-based solvents.

However, in the precipitation process by the dropwise addition, an excessive amount of antisolvent, typically 5 times to 20 times more than the pure polymer, should be used in order to completely precipitate the polymers dissolved in the polymerization solution in solid particles form.

If a commercial process for a large scale production is concerned for this polymer recovery method of dropwise addition of antisolvent, the excessive amount of antisolvent used for polymer recovery has to be reused. This means that in order to recover and purify the used antisolvent, fractional distillation has to be performed using multiple distillation columns, which requires high costs for equipment and operation.

Further, after precipitating the polymers by the dropwise addition method, post-treatment process including separation of the polymer from the antisolvent and washing/drying of the polymer should be followed.

Generally, the polymer needs to be desirably recovered in a particle or pellet form for packaging. However, the cyclic olefin-based polymer does not melt at a typical extrusion temperature of 200 to 300° C. The polymer will be decomposed by further increase of temperature. Also, the cyclic olefin-based monomers typically show extremely high boiling point temperature (>150° C.), making it difficult to recover polymer through conventional steam stripping process.

Accordingly, due to the above-mentioned thermal properties of the cyclic olefin-based monomers and polymers, it is impossible to obtain the pellet form of polymer using extruder-type equipment.

The preparation method of the cyclic olefin-based polymers using conventional solution polymerization method is advantageous with respect to polymerization yield, molecular weight of the obtained polymer, and amount of the used catalyst. However, it has a significant disadvantage in that a high cost is required to recover the polymer in a particle form from the obtained polymer solution when the polymer is not melt-processable and its monomers have high boiling point temperature.

DISCLOSURE OF INVENTION

Technical Problem

It is an object of the present invention to provide a method for preparing a polymer by precipitation polymerization, in which an antisolvent a), monomer b), and catalyst c) are mixed together, and a polymer synthesized is precipitated in a solid phase, and its particle grows with time during polymerization, thus the polymer has a suitable particle size after the reaction is finished.

Technical Solution

The present invention provides a method for preparing a polymer by precipitation polymerization, comprising the steps of mixing an antisolvent a), a monomer b), and a catalyst c), and while polymerizing the monomers, simultaneously precipitating the polymer formed by the polymerization of monomers b) in a solid phase.

Advantageous Effects

According to the method for preparing a polymer by precipitation polymerization of the present invention, solid particles of polymer having suitable levels of polymerization yield and weight-average molecular weight (Mw) can be directly obtained without post-processing that is required to recover the polymer from a polymer solution after polymerization in conventional solution polymerization process. Thus, the process can be simplified, as compared to the conventional solution polymerization, which dramatically reduces the costs for equipment and operation in the commercial scale production.

Further, the amount of the antisolvent used is greatly reduced, which reduces the costs for equipment and operation in the commercial production scale, and minimizes the environmental load due to excessive use of chemicals.

BEST MODE FOR CARRYING OUT THE INVENTION

The present invention provides a method for preparing a polymer by precipitation polymerization, comprising the steps of mixing an antisolvent a), a monomer b), and a catalyst c), and while polymerizing the monomers, simultaneously precipitating a polymer formed by the polymerization of monomers b) in a solid phase.

In the preparation method according to the present invention, the antisolvent a), monomer b), and catalyst c) are mixed at the same time, and while the monomers b) are polymerized in the presence of the catalyst c), the formed polymer is simultaneously precipitated in a solid phase by an antisolvent. When the polymer is started to be precipitated in a solid phase, the mixture of a), b), and c) is present as a slurry form having a low viscosity, in which a solid phase and a liquid phase are mixed. At this time, the weight ratio of antisolvent to polymer in the slurry ray be 0.1 to 10.

The polymer prepared by the preparation method according to the present invention may have a bulk density of 0.2 to 0.5 g/ml.

The antisolvent a) has preferably any one structure selected from linear, branched, and cyclic structures having 5 to 20 carbon atoms, and more preferably any one selected from normal hexane, cyclohexane, and heptane.

The antisolvent a) is preferably added in a ratio of 10 to 90% based on the weight of the monomer b).

As the catalyst c), a catalyst mixture that has a recitalist containing a metal of Group 10 represented by the following Formula 1 and a cocatalyst containing a salt compound with phosphonium represented by the following Formula 2 may be used.

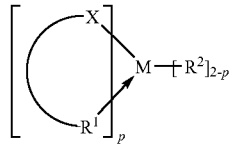

[Formula 1]

wherein X is a hetero atom selected from S, O and N;
$R^1$ is $-CH=CHR^{20}$, $-OR^{20}$, $SR^{20}$, $-N(R^{20})_2$, $-N=NR^{20}$, $-P(R^{20})_2$, $-C(O)R^{20}$, $-C(R^{20})=NR^{20}$, $-C(O)OR^{20}$, $-OC(O)OR^{20}$, $-OC(O)R^{20}$, $-C(R^{20})=CHC(O)R^{20}$ or $-R^{21}C(O)R^{20}$, $-R^{21}C(O)OR^{20}$ or $-R^{21}OC(O)R^{20}$; $R^{20}$ is hydrogen, halogen, substituted or unsubstituted, linear or branched alkyl having 1 to 5 carbon atoms, substituted or unsubstituted, linear or branched haloalkyl having 1 to 5 carbon atoms, substituted or unsubstituted cycloalkyl having 5 to 10 carbon atoms, substituted or unsubstituted, linear or branched alkenyl having 2 to 5 carbon atoms, substituted or unsubstituted, linear or branched haloalkenyl having 2 to 5 carbon atoms, or substituted or unsubstituted aralkyl having 7 to 24 carbon atoms, and when two or more $R^{20}$ are present, they are the same or different from each other; $R^{21}$ is hydrocarbylene having 1 to 20 carbon atoms;

$R^2$ is substituted or unsubstituted, linear or branched alkyl having 1 to 20 carbon atoms, substituted or unsubstituted, linear or branched alkenyl having 2 to 20 carbon atoms, substituted or unsubstituted cycloalkyl having 5 to 12 carbon atoms, substituted or unsubstituted aryl having 6 to 40 carbon atoms, substituted or unsubstituted aralkyl having 7 to 15 carbon atoms, or substituted or unsubstituted alkynyl having 3 to 20 carbon atoms;

M is a metal of Group 10;
p is 0 to 2;

$[(R^3)-P(R^4)_n(R^{4'})_b[Z(R^5)_d]_c][Ani]$      [Formula 2]

wherein a, b and c are each an integer of 0 to 3, with the proviso that a+b+c=3;
z is oxygen, sulfur, silicon, or nitrogen;
d is 1, with the proviso that z is oxygen or sulfur, d is 2, with the proviso that z is nitrogen, and d is 3, with the proviso that z is silicon;
$R^3$ is hydrogen or alkyl or aryl;
$R^4$, $R^{4'}$ and $R^5$ are each independently hydrogen; substituted or unsubstituted, linear or branched alkyl having 1 to 20 carbon atoms; substituted or unsubstituted, linear or branched alkenyl having 2 to 20 carbon atoms; substituted or unsubstituted alloxy having 1 to 20 carbon atoms; substituted or unsubstituted cycloalkyl having 3 to 12 carbon atoms; substituted or unsubstituted aryl having 6 to 40 carbon atoms; substituted or unsubstituted aralkyl having 7 to 15 carbon atoms; substituted or unsubstituted alkynyl having 3 to 20 carbon atoms; substituted or unsubstituted tri(linear or branched alkyl having 1 to 10 carbon atoms)silyl; substituted or unsubstituted tri(linear or branched alkoxy having 1 to 10 carbon atoms)silyl; substituted or unsubstituted tri(substituted or unsubstituted cycloalkyl having 3 to 12 carbon atoms)silyl; substituted or unsubstituted tri(substituted or unsubstituted aryl having 6 to 40 carbon atoms)silyl; substituted or unsubstituted tri(substituted or unsubstituted aryloxy having 6 to 40 carbon atoms)silyl; substituted or unsubstituted tri (linear or branched alkyl having 1 to 10 carbon atoms)siloxy; substituted or unsubstituted tri(substituted or unsubstituted cycloalkyl having 3 to 12 carbon atoms)siloxy; substituted or unsubstituted tri(substituted or unsubstituted aryl having 6 to 40 carbon atoms)siloxy, and when two or more of the substituent selected from $R^4$, $R^{4'}$ and $R^5$ are present, they are the same or different from each other,

[Ani] is an anion capable of weakly coordinating to the metal M of Formula 1.

Specific examples of the anion may be selected from the group consisting of borate, aluminate, $[SbF_6]-$, $[PF_6]-$, $[AsF_6]-$, perfluoroacetate $([CF_3CO_2]-)$, perfluoropropionate $([C_2F_5CO_2]-)$, perfluorobutyrate $([CF_3CF_2CF_2CO_2]-)$, perchlorate $([ClO_4]-)$, p-toluenesulfonate $([p-CH_3C6H_4SO_3]-)$, $[SO_3CF_3]-$, borata benzene, and carborane that is substituted or unsubstituted with halogen.

The term 'substituted or unsubstituted' as used herein refers that a group may be substituted or unsubstituted with halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl, siloxy or the like.

Further, the term 'alkenyl' as used herein includes vinyl and allyl.

In this connection, borate or aluminate of Formula 2 nay be, more specifically, an anion represented by the following Formula 2a or Formula 2b.

$$[M'(R^6)_4] \qquad \text{[Formula 2a]}$$

$$[M'(OR^6)_4] \qquad \text{[Formula 2b]}$$

wherein M' is boron or aluminum; $R^6$ is each independently halogen; linear or branched alkyl having 1 to 20 carbon atoms that is substituted or unsubstituted with halogen; linear or branched alkenyl having 2 to 20 carbon atoms that is substituted or unsubstituted with halogen; cycloalkyl having 3 to 12 carbon atoms that is substituted or unsubstituted with halogen; aryl having 6 to 40 carbon atoms that is substituted or unsubstituted with hydrocarbon having 3 to 20 carbon atoms; aryl having 6 to 40 carbon atoms that is substituted with linear or branched trialkylsiloxy having 3 to 20 carbon atoms or linear or branched triarylsiloxy having 18 to 48 carbon atoms; aralkyl having 7 to 15 carbon atoms that is substituted or unsubstituted with halogen.

The monomer b) nay be a cyclic olefin-based monomer having a boiling point of 150° C. or more, but is not limited thereto. A variety of monomers can be applied to the present invention.

As the cyclic olefin-based monomer, a norbornene-based monomer containing a polar functional group or derivatives thereof can be used. The cyclic norbornene-based monomer or norbornene derivatives refers to a monomer containing at least one unit of norbornene(bicyclo[2,2,1]hept-2-ene). The norbornene-based monomer is preferably a compound represented by the following Formula 3:

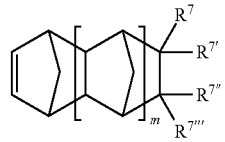

[Formula 3]

wherein m is an integer of 0 to 4, $R^7$, $R^{7'}$, $R^{7''}$ and $R^{7'''}$ are the same or different from each other, and each independently a nonpolar functional group selected from the group consisting of hydrogen; halogen; linear or branched alkyl having 1 to 20 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl and siloxy; linear or branched alkenyl having 2 to 20 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl and siloxy; linear or branched alkynyl having 3 to 20 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl and siloxy; cycloalkyl having 3 to 12 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl and siloxy; aryl having 6 to 40 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl and siloxy; and aralkyl having 7 to 15 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alloxy, haloalloxy, carbonyloxy, halocarbonyloxy, aryloxy, haloaryloxy, silyl and siloxy, or a polar functional group selected from the group consisting of $-R^8OR^9$, $-OR^9$, $-OC(O)OR^9$, $-R^8OC(O)OR^9$, $-C(O)R^9$, $-R^8C(O)OR^9$, $-C(O)OR^9$, $-R^8C(O)R^9$, $-OC(O)R^9$, $-R^8OC(O)R^9$, $-(R^8O)_k-OR^9$ (k is an integer of 1 to 10), $-(OR^8)_k-OR^9$ (k is an integer of 1 to 10), $-C(O)-O-C(O)R^9$, $-R^8C(O)-O-C(O)R^9$, $-SR^9$, $-R^8SR^9$, $-SSR^9$, $-R^8SSR^9$, $-S(=O)R^9$, $-R^8S(=O)R^9$, $-R^8C(=S)R^9-$, $-R^8C(=S)SR^9$, $-R^8SO_2R^9$, $-SO_2R^9$, $-R^8OSO_2R^9$, $-R^8SO_3R^9$, $-SO_3R^9$, $-R^8OSO_3R^9$, $-R^8N=C=S$, $-N=C=S$, $-NCO$, $-R^8-NCO$, $-CN$, $-R^8CN$, $-NNC(=S)R^9$, $-R^8NNC(=S)R^9$, $-NO_2$, $-R^8NO_2$,

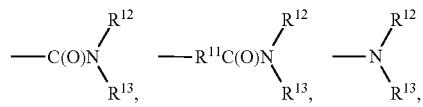

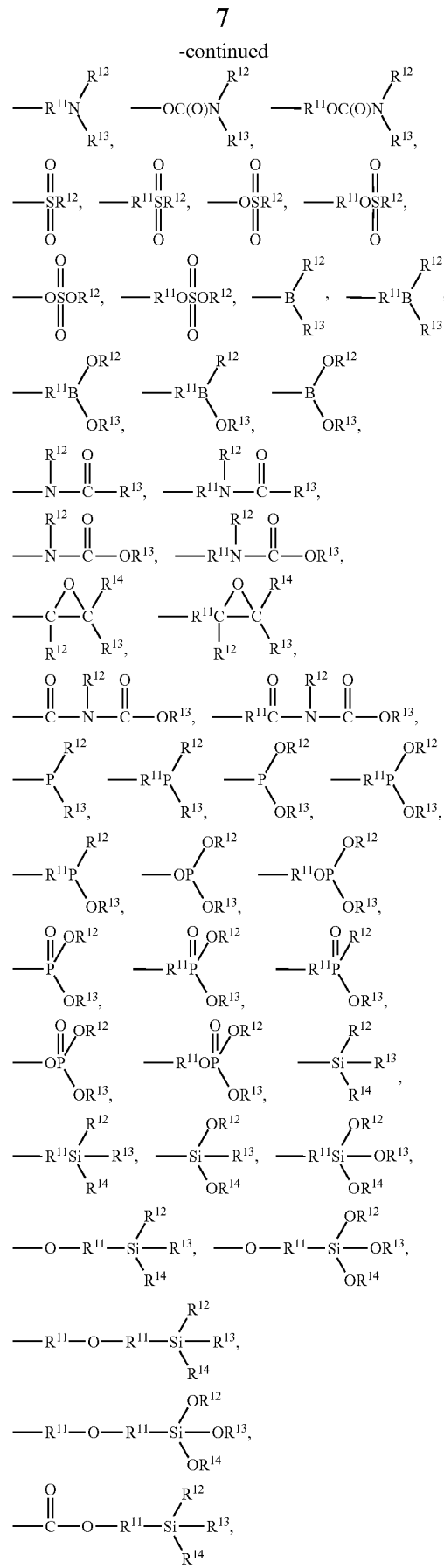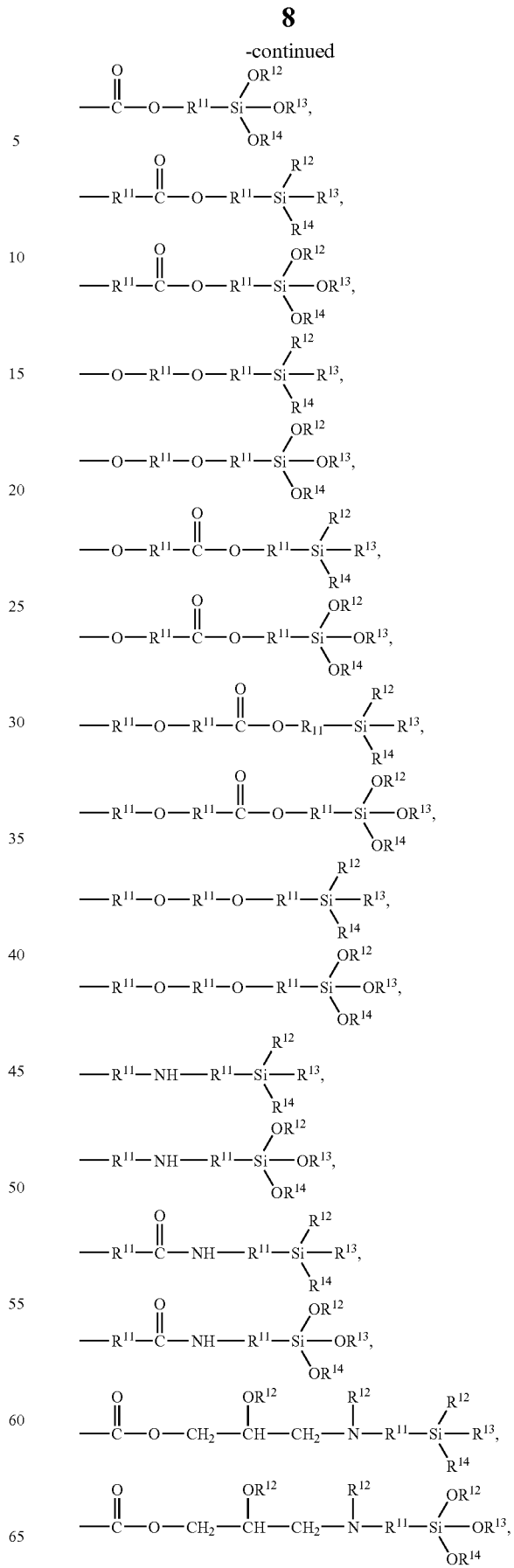

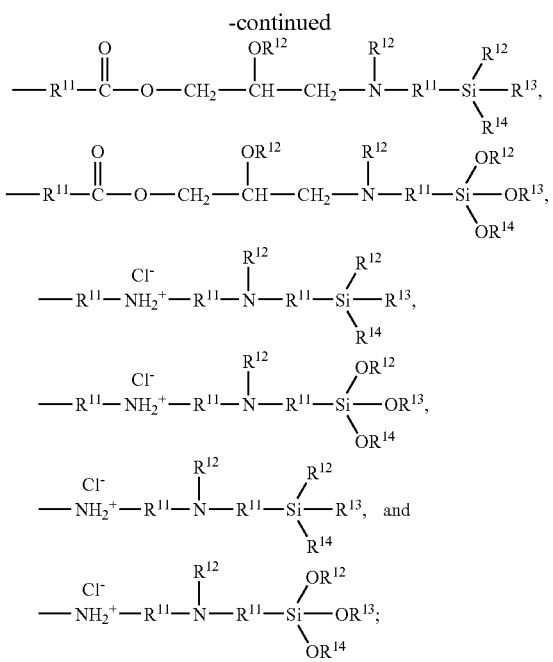

in the polar functional group, $R^8$ and $R^{11}$ are the same or different from each other, and each independently linear or branched alkylene having 1 to 20 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; linear or branched alkenylene having 2 to 20 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; linear or branched alkynylene having 3 to 20 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; cycloalkylene having 3 to 12 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; arylene having 6 to 40 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; aralkylene having 7 to 15 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; alloxylene that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; or carbonyloxylene that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy, and when two or more of $R^8$ or $R^{11}$ are present, they are the same or different from each other;

$R^9$, $R^{12}$, $R^{13}$ and $R^{14}$ are the same or different from each other, and each independently hydrogen; halogen; linear or branched alkyl having 1 to 20 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; linear or branched alkenyl having 2 to 20 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; linear or branched alkynyl having 3 to 20 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; cycloalkyl having 3 to 12 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; aryl having 6 to 40 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; aralkyl having 7 to 15 carbon atoms that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; alloxy that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy; or carbonyloxy that is substituted or unsubstituted with one or more substituents selected from halogen, alkyl, alkenyl, alkynyl, haloalkyl, haloalkenyl, haloalkynyl, aryl, aralkyl, alloxy, haloalloxy, carbonyloxy, halocarbonyloxy, aryloxy, haloaryloxy, silyl and siloxy, and when two or more $R^{12}$ are present, they are the same or different from each other, When $R^7$, $R^{7'}$, $R^{7''}$ and $R^{7'''}$ are not a polar functional group, hydrogen, or halogen, they may be connected to each other to form an alkylidene group having 1 to 10 carbon atoms, or connected to any one of $R^7$, $R^{7'}$, $R^{7''}$ and $R^{7'''}$ to form a saturated or unsaturated ring having 4 to 12 carbon atoms, or an aromatic ring having 6 to 17 carbon atoms.

The cyclic olefin-based monomer, the antisolvent a) and the catalyst mixture are injected to a reactor, and reacted at 50 to 150° C. to prepare a cyclic olefin-based polymer.

The cyclic olefin-based polymer prepared by mixing the cyclic olefin-based monomer with the antisolvent a) and the catalyst mixture nay have a weight-average molecular weight (Mw) of 50,000 to 500,000.

Hereinafter, as an embodiment of the present invention, a method for preparing a cyclic olefin-based polymer will be described in detail. However, the invention is not intended to be limited by the embodiment.

As an embodiment of the present invention, the method for preparing a cyclic olefin-based polymer is a method, in which while polymerization is proceeding, the polymer is precipitated in a particle form and the precipitated particles aggregates with each other to grow, thus solid particles of polymer can be directly obtained without post-processing that is required to recover the polymer from a solution after polymerization in solution polymerization.

The method for preparing a cyclic olefin-based polymer comprises the steps of:

i) preparing a catalyst mixture that has a precatalyst containing a metal of Group 10 represented by Formula 1 and a cocatalyst containing a salt compound with phosphonium represented by Formula 2; and ii) injecting the catalyst mixture, antisolvent, and cyclic olefin-based monomer into a reactor to perform addition polymerization in solution containing the cyclic olefin-based monomer and antisolvent in the presence of the catalyst mixture at 50 to 150° C. Thus, after the reaction, the solid particles of polymer can be obtained.

The catalyst mixture has the precatalyst containing a metal of Group 10 represented by Formula 1 and the cocatalyst containing a salt compound with phosphonium represented by Formula 2, and is not decomposed by heat and has high activity at a polymerization temperature of 50 to 150° C.

The compound with phosphonium used as the catalyst has an electronically stabilizing ability, and thermally and chemically activates the transition metal compound. The molar ratio of the catalyst to the precatalyst containing the transition metal of Group 10 may be in the range of 0.5:1 to 10:1. When the Molar ratio of the cocatalyst to the precatalyst is less than 0.5:1, the effect of activating the precatalyst is insufficient. When the molar ratio of the cocatalyst to the precatalyst is greater than 10:1, an excess of a phosphonium compound coordinates to the metal to prevent a norbornene monomer from coordinating to the metal and the cationic catalyst active species is too electronically stabilized to interact with the double bond of a norbornene monomer, thereby resulting in a decrease in both polymerization yield and molecular weight (Mw).

The catalyst mixture can be used in a solid phase without using a solvent or can be mixed in a solvent to form an activated catalyst solution, then can be used. Further, each of the precatalyst and cocatalyst can be dissolved in a separate solvent, and then added to the polymerization reaction. Solvents in which the catalyst mixture may be dissolved include dichloromethane, dichloroethane, toluene, chlorobenzene or a mixture thereof.

The catalyst mixture may be a metal catalyst complex composed of the precatalyst and the cocatalyst. The molar ratio of the catalyst mixture based on the precatalyst to the total monomers contained in the monomer solution is in the range of 1:2,500 to 1:200,000. This ratio of the catalyst to the monomers is far smaller than that used in a conventional catalyst system, but the norbornene-based monomer having a polar functional group can be polymerized with high yield. More preferably, the molar ratio of the catalyst mixture to the monomers is in the range of 1:5,000 to 1:20,000.

As for the cyclic olefin-based monomer, a norbornene-based monomer containing a polar functional group used in the preparation of cyclic olefin-based polymer can be used, but is not limited thereto.

As for the antisolvent, normal hexane, cyclohexane, and heptane or the like, in which polymers are not dissolved, can be used. The volume ratio of the monomer to the antisolvent can be controlled in the range of 0.1 to 0.9. As the volume ratio of the monomer to the antisolvent is lower, the formation of particles is better and the aggregation force occurring between particles is weaker, but its yield and weight-average molecular weight (Mw) tend to decrease. In contrast, as the volume ratio of the monomer to the antisolvent is higher, its yield and weight-average molecular weight (Mw) tend to increase. However, the formation of particles is difficult in the initial stage of reaction, and the particles are precipitated and the aggregation between particles becomes severer in the later stage of reaction. If the volume ratio of the monomer to the antisolvent becomes 1, the bulk polymerization without the aid of a solvent occurs, in which polymers are completely dissolved in monomers, resulting in no precipitation.

When the cyclic olefin-based polymer is prepared according to the present invention, the polymer is precipitated in a particle form and the precipitated particles grow, while polymerization is proceeding. After the reaction is completed, solid particles of polymer can be obtained, in which the yield reaches 10% to 80%, and the weight-average molecular weight (Mw) of the prepared polymer is 60,000 to 290,000.

As an example of cyclic olefin-based polymer prepared in accordance with the method of the present invention, the norbornene-based polymer is transparent, and has sufficient adhesion to metals. Further, the norbornene-based polymer is a cyclic olefin-based polymer that has excellent thermal stability and strength and exhibits a low dielectric constant sufficient to be used as insulating electronic materials. The polymer has a desirable adhesion to substrates of electronic components without requiring a coupling agent, and at the same time, a sufficient adhesion to metal substrates such as Cu, Ag and Au. Further, the polymer exhibits desirable optical properties so that it can be used as materials for protective films of polarizing plates and LCD panels, and as electronic components such integrated circuits, printed circuit boards, and multichip modules.

The cyclic olefin-based polymer prepared according to the present invention have various applications, e.g., optical components such as CDs, DVDs and POFs (plastic optical fibers); information and electronic components such as capacitor films and low-dielectrics; and medical components such as low-absorbent syringes, blister packaging, etc.

MODE FOR THE INVENTION

Hereinafter, the present invention will be described in more detail with reference to Examples. However, the present invention is not intended to be limited by these Examples.

In the following Examples, all operations handling the compounds that are sensitive to air or water were carried out using standard Schlenk techniques and dry box techniques. A weight-average molecular weight (Mw) and molecular weight distribution (Mw/Mn) of polymer were determined using a GPC (gel permeation chromatography) based on polystyrene standards. Toluene was distilled and purified from potassium/benzophenone, and dichloromethane and chlorobenzene were distilled from $CaH_2$ to be used. As for normal hexane and cyclohexane industrial grades were used without further purification. Anhydrous heptane (99%) was purchased from Aldrich and used without further purification.

Example 1

Polymerization of 5-norbornene-2-allylacetate Using Normal Hexane as Antisolvent 5-norbornene-2-allylacetate (AANB, 100 ml, 556.0 mmol) and 400 ml of normal hexane were introduced into a 1000 ml high pressure glass reactor. $Pd(OAc)_2$ (OAc=acetate, 14 mg, 61.7 μmol) and $[HP(Cy)_3][B(C_6F_5)_4]$ (88.8 mg, 92.6 μmol) were introduced into a 250 ml schlenk flask and 5 ml of dichloromethane was added to be dissolved. The prepared catalyst solution was added to the reactor containing the monomers and antisolvent with a syringe, and reacted at 90° C. for 18 hours. At this time, the speed of impeller was set at 200 rpm [revolution per minute]. After the reaction was completed, the polymer precipitates were obtained in a white particle form. The precipitates were washed with an excessive amount of normal hexane, and the polymers were recovered using an aspiration method. Then, the polymers were dried in a vacuum oven at 80° C. for 24 hours to obtain 19.05 g of 5-norbornene-2-allylacetate polymer (19% by weight based on the total weight of the added monomer). Its weight-average molecular weight (Mw) was 138,854, and molecular weight distribution (Mw/Mn) was 1.99.

Example 2

Polymerization of 5-norbornene-2-allylacetate Using Cyclohexane as Antisolvent 5-norbornene-2-allylacetate (AANB, 70 ml, 389.2 mmol) and 430 ml of cyclohexane were introduced into a 1000 ml high pressure glass reactor. Pd(OAc)$_2$ (OAc=acetate, 9.66 mg, 42.6 µmol) and [HP(Cy)$_3$][B(C$_6$F$_5$)$_4$] (62.2 mg, 64.9 µmol) were introduced into a 250 ml schlenk flask and 5 ml of dichloromethane was added to be dissolved. The prepared catalyst solution was added to the reactor containing the monomers and antisolvent with a syringe, and reacted at 90° C. for 18 hours. At this time, the speed of impeller was set at 200 rpm [revolution per minute]. After the reaction was completed, the polymer precipitates were obtained in a white particle form. The polymers were washed and dried in the same manner as in Example 1. After drying, 10.0 g of 5-norbornene-2-allylacetate polymer (14.3% by weight based on the total weight of the added monomer) were obtained. Its weight-average molecular weight (Mw) was 114,533, and molecular weight distribution (Mw/Mn) was 1.80.

Examples 3 to 7

Polymerization of 5-norbornene-2-allylacetate Using Heptane as Antisolvent 5-norbornene-2-allylacetate (AANB) was polymerized using heptane as an antisolvent, in which the ratio of monomer to antisolvent was changed to 13%, 20%, 33%, 53%, and 67%. The antisolvent (ml): monomer (ml) of 130:20, 120:30, 100:50, 70:80, and 50:100 were added to each of five 250 ml schlenk flasks. As a catalyst, Pd(OAc)$_2$ (70.3 mg, 313.2 µmol) and [HP(Cy)$_3$][B(C$_6$F$_5$)$_4$] (451.5 mg, 471.1 µmol) were dissolved in dichloromethane (10 ml), and then 1 ml of the prepared catalyst was added to each flask with a syringe. The mixtures were reacted under stirring using a magnetic stirrer at 90° C. for 18 hours. The process of recovering the polymer was performed in the same manner as in Example 1, and 5-norbornene-2-allylacetate polymer was prepared. The results are shown in Table 1.

TABLE 1

| Item | Heptane (ml) | AANB (ml) | amount of polymer obtained (g) | Yield of polymer (wt %) | Mw | Mw/Mn |
|---|---|---|---|---|---|---|
| Example 3 | 130 | 20 | 5.7 | 28.4 | 69,056 | 1.27 |
| Example 4 | 120 | 30 | 12.1 | 40.4 | 105,086 | 1.50 |
| Example 5 | 100 | 50 | 15.4 | 30.8 | 223,006 | 1.88 |

TABLE 1-continued

| Item | Heptane (ml) | AANB (ml) | amount of polymer obtained (g) | Yield of polymer (wt %) | Mw | Mw/Mn |
|---|---|---|---|---|---|---|
| Example 6 | 70 | 80 | 35.3 | 44.1 | 267,563 | 1.83 |
| Example 7 | 50 | 100 | 80.0 | 80.0 | 288,195 | 1.87 |

Example 8

Copolymerization of 5-norbornene-2-allylacetate and butylnorbornene 5-norbornene-2-allylacetate (NB—CH$_2$—O—C(O)—CH$_3$) (5 ml, 30.9 mmol) and butyl-norbornene (1.3 ml, 7.7 mmol) were used as a monomer, and Pd(OAc)$_2$ (0.17 mg, 0.77 µmol) and [(Cy)$_3$PH][B(CrF$_5$)$_4$] (1.48 mg, 1.55 µmol) were used as a catalyst. The polymerization was carried out under the same antisolvent, polymerization conditions, and method as in Example 1. As a result, 4.35 g of polymer (69.2% by weight) was obtained. Its weight-average molecular weight (Mw) was 303,550, and molecular weight distribution (Mw/Mn) was 2.16.

Example 9

Copolymerization of Norbornene Carboxylic Acid Methylester and Butylnorbornene

Norbornene carboxylic add methylester (14.64 g, 96.22 mmol) and butylnorbornene (6.14 g, 41.24 mmol) were used as a monomer, and palladium(II) acetylacetonate (4.19 mg) and [(Cy)$_3$PH][B (C$_6$F$_5$)$_4$] (27.1 mg) were used as a catalyst. The polymerization was carried out under the same antisolvent, polymerization conditions, and method as in Example 1. As a result, 12.08 g of polymer (58.1% by weight) was obtained. Its weight-average molecular weight (Mw) was 116,000, and molecular weight distribution (Mw/Mn) was 1.97.

Accordingly, solid particles of polymer having a polymerization yield of 10% or more and a weight-average molecular weight (Mw) of 60,000 or more can be obtained by the method for preparing a polymer by precipitation polymerization of the present invention.

Further, according to the preparation method of the present invention, post-treatment process such as dropwise addition method which uses excessive antisolvent to recover polymer from the liquid polymer solution obtained after polymerization reaction in solution polymerization process is not needed. Thus, the process can be simplified, as compared to the conventional solution polymerization, which dramatically reduces the costs for equipment and operation in commercial scale production.

The invention claimed is:

1. A method for preparing a polymer by precipitation polymerization, comprising the steps of mixing an antisolvent a), which does not dissolve the polymer prepared by polymerization, monomers including at least one cyclic olefin based monomer b), and a catalyst c), and while polymerizing the monomers b) in the antisolvent, simultaneously precipitating the polymer formed by the monomers b) in a solid phase to directly obtain the polymer without post-processing, wherein as the catalyst c), a catalyst mixture that has a precatalyst containing a metal of Group 10 represented by the following Formula 1 and a cocatalyst containing a salt compound with phosphonium represented by the following Formula 2 is used:

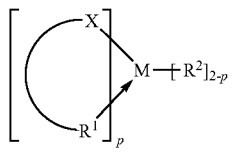
[Formula 1]

wherein X is a hetero atom selected from S, O and N;
$R^1$ is —CH=CHR$^{20}$, —OR$^{20}$, —SR$^{20}$, —N(R$^{20}$)$_2$, —N=NR$^{20}$, —P(R$^{20}$)$_2$, —C(O)R$^{20}$, —C(R$^{20}$)=NR$^{20}$, —C(O)OR$^{20}$, —OC(O)OR$^{20}$, —OC(O)R$^{20}$, —C(R$^{20}$)=CHC(O)R$^{20}$ or —R$^{21}$C(O)R$^{20}$, —R$^{21}$C(O)OR$^{20}$ or —R$^{21}$OC(O)R$^{20}$; R$^{20}$ is hydrogen, halogen, substituted or unsubstituted, linear or branched alkyl having 1 to 5 carbon atoms, substituted or unsubstituted, linear or branched haloalkyl having 1 to 5 carbon atoms, substituted or unsubstituted cycloalkyl having 5 to 10 carbon atoms, substituted or unsubstituted, linear or branched alkenyl having 2 to 5 carbon atoms, substituted or unsubstituted, linear or branched haloalkenyl having 2 to 5 carbon atoms, or substituted or unsubstituted aralkyl having 7 to 24 carbon atoms, and when two or more R$^{20}$ are present, they are the same or different from each other; R$^{21}$ is hydrocarbylene having 1 to 20 carbon atoms;
$R^2$ is substituted or unsubstituted, linear or branched alkyl having 1 to 20 carbon atoms, substituted or unsubstituted, linear or branched alkenyl having 2 to 20 carbon atoms, substituted or unsubstituted cycloalkyl having 5 to 12 carbon atoms, substituted or unsubstituted aryl having 6 to 40 carbon atoms, substituted or unsubstituted aralkyl having 7 to 15 carbon atoms, or substituted or unsubstituted alkynyl having 3 to 20 carbon atoms;
M is a metal of Group 10;
p is 0 to 2;

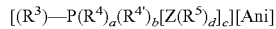
[Formula 2]

wherein a, b and c are each an integer of 0 to 3, with the proviso that a+b+c=3; z is oxygen, sulfur, silicon, or nitrogen; d is 1, with the proviso that z is oxygen or sulfur, d is 2, with the proviso that z is nitrogen, and d is 3, with the proviso that z is silicon;
$R^3$ is hydrogen or, alkyl or aryl;
$R^4$, $R^{4'}$ and $R^5$ are each independently hydrogen; substituted or unsubstituted, linear or branched alkyl having 1 to 20 carbon atoms; substituted or unsubstituted, linear or branched alkenyl having 2 to 20 carbon atoms; substituted or unsubstituted alloxy having 1 to 20 carbon atoms; substituted or unsubstituted cycloalkyl having 3 to 12 carbon atoms; substituted or unsubstituted aryl having 6 to 40 carbon atoms; substituted or unsubstituted aralkyl having 7 to 15 carbon atoms; substituted or unsubstituted alkynyl having 3 to 20 carbon atoms; substituted or unsubstituted tri(linear or branched alkyl having 1 to 10 carbon atoms)silyl; substituted or unsubstituted tri(linear or branched alloxy having 1 to 10 carbon atoms)silyl; substituted or unsubstituted tri(substituted or unsubstituted cycloalkyl having 3 to 12 carbon atoms) silyl; substituted or unsubstituted tri(substituted or unsubstituted aryl having 6 to 40 carbon atoms)silyl; substituted or unsubstituted tri(substituted or unsubstituted aryloxy having 6 to 40 carbon atoms)silyl; substituted or unsubstituted tri(linear or branched alkyl having 1 to 10 carbon atoms)siloxy; substituted or unsubstituted tri(substituted or unsubstituted cycloalkyl having 3 to 12 carbon atoms)siloxy; substituted or unsubstituted tri (substituted or unsubstituted aryl having 6 to 40 carbon atoms)siloxy, and when two or more of the substituent selected from R$^4$, R$^{4'}$ and R$^5$ are present, they are the same or different from each other, and
[Ani] is an anion capable of weakly coordinating to the metal M of Formula 1,
wherein the cyclic olefin-based monomer b) is a compound represented by the following Formula 3:

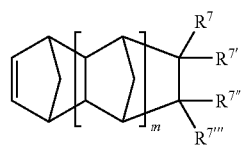
[Formula 3]

wherein m is an integer of 0 to 4,
$R^7$, $R^{7'}$, $R^{7''}$ and $R^{7'''}$ are the same or different from each other, and each is independently a nonpolar functional group selected from the group consisting of hydrogen; halogen; linear or branched alkyl having 1 to 20 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; linear or branched alkenyl having 2 to 20 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; linear or branched alkynyl having 3 to 20 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; cycloalkyl having 3 to 12 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; aryl having 6 to 40 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; and aralkyl having 7 to 15 carbon atoms that is substituted or unsubstituted with one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy, or a polar functional group selected from the group consisting of
—R$^8$OR$^9$, —OR$^9$, —OC(O)OR$^9$, —R$^8$OC(O)OR$^9$, —C(O)R$^9$, —R$^8$C(O)OR$^9$, —C(O)OR$^9$, —R$^8$C(O)R$^9$, —OC(O)R⁹, —R⁸OC(O)R⁹, —(R⁸O)ₖ—OR⁹ (k is an integer of 1 to 10), —(OR⁸)ₖ—OR⁹ (k is an integer of 1 to 10), —C(O)—O—C(O)R⁹, —R⁸C(O)—O—C(O)R⁹, —SR⁹, —R⁸SR⁹, —SSR⁹, —R⁸SSR⁹, —S(=O)R⁹, —R⁸S(=O)R⁹, —R⁸C(=S)R⁹—, —R⁸C(=S)SR⁹, —R⁸SO₂R⁹, —SO₂R⁹, —R⁸OSO₂R⁹, —R⁸SO₃R⁹, —SO₃R⁹, —R⁸OSO₃R⁹, —R⁸N=C=S, —N=C=S, —NCO, —R⁸—NCO, —CN, —R⁸CN, —NNC(=S)R⁹, —R⁸NNC(=S)R⁹, —NO₂, —R⁸NO₂,
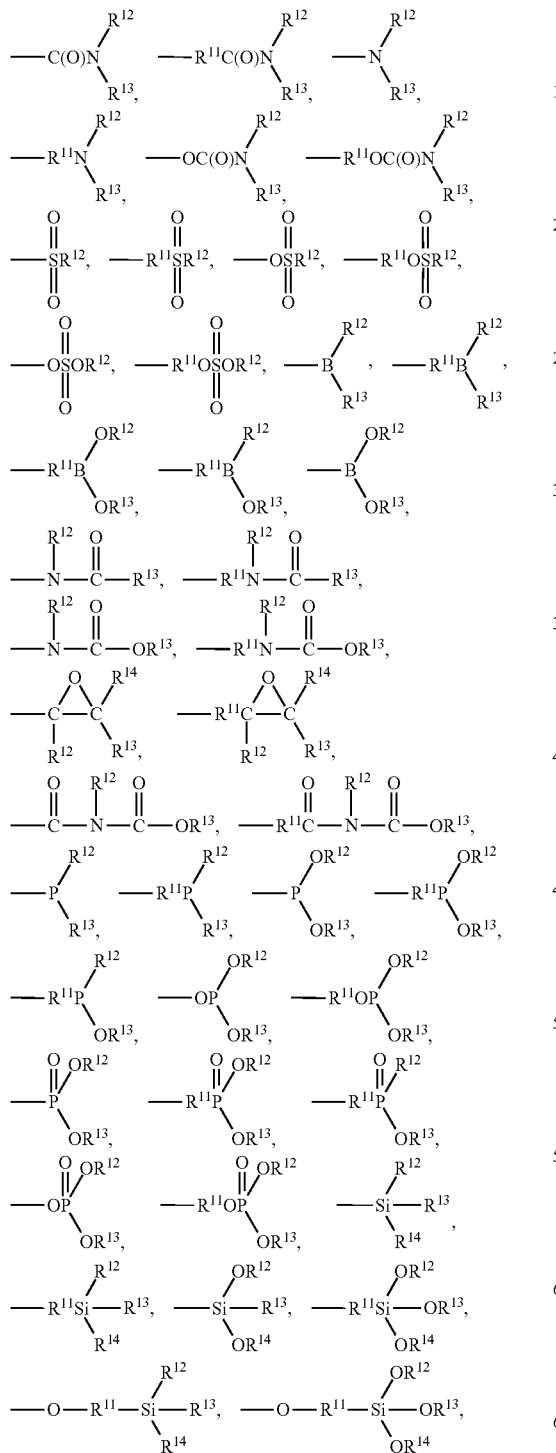
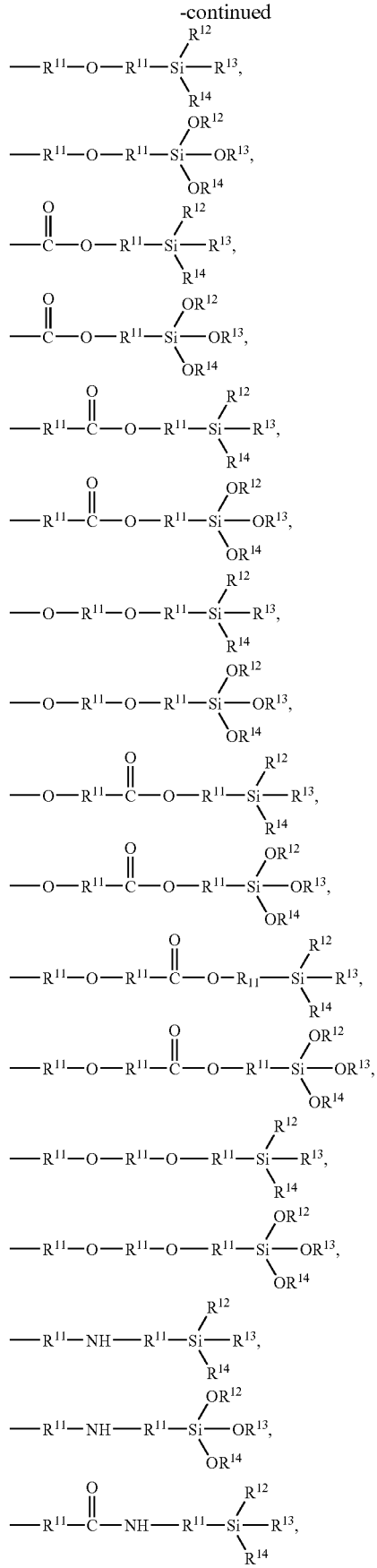

-continued $$-R^{11}-\overset{O}{\overset{\|}{C}}-NH-R^{11}-\overset{OR^{12}}{\underset{OR^{14}}{\overset{|}{Si}}}-OR^{13},$$

$$-\overset{O}{\overset{\|}{C}}-O-CH_2-\overset{OR^{12}}{\underset{}{\overset{|}{CH}}}-CH_2-\overset{R^{12}}{\underset{}{\overset{|}{N}}}-R^{11}-\overset{R^{12}}{\underset{R^{14}}{\overset{/}{Si}}}-R^{13},$$

$$-\overset{O}{\overset{\|}{C}}-O-CH_2-\overset{OR^{12}}{\underset{}{\overset{|}{CH}}}-CH_2-\overset{R^{12}}{\underset{}{\overset{|}{N}}}-R^{11}-\overset{OR^{12}}{\underset{OR^{14}}{\overset{/}{Si}}}-OR^{13},$$

$$-R^{11}-\overset{O}{\overset{\|}{C}}-O-CH_2-\overset{OR^{12}}{\underset{}{\overset{|}{CH}}}-CH_2-\overset{R^{12}}{\underset{}{\overset{|}{N}}}-R^{11}-\overset{R^{12}}{\underset{R^{14}}{\overset{/}{Si}}}-R^{13},$$

$$-R^{11}-\overset{O}{\overset{\|}{C}}-O-CH_2-\overset{OR^{12}}{\underset{}{\overset{|}{CH}}}-CH_2-\overset{R^{12}}{\underset{}{\overset{|}{N}}}-R^{11}-\overset{OR^{12}}{\underset{OR^{14}}{\overset{/}{Si}}}-OR^{13},$$

$$-R^{11}-\overset{Cl^-}{\underset{}{\overset{|}{NH_2^+}}}-R^{11}-\overset{R^{12}}{\underset{}{\overset{|}{N}}}-R^{11}-\overset{R^{12}}{\underset{R^{14}}{\overset{/}{Si}}}-R^{13},$$

$$-R^{11}-\overset{Cl^-}{\underset{}{\overset{|}{NH_2^+}}}-R^{11}-\overset{R^{12}}{\underset{}{\overset{|}{N}}}-R^{11}-\overset{OR^{12}}{\underset{OR^{14}}{\overset{/}{Si}}}-OR^{13},$$

$$-\overset{Cl^-}{\underset{}{\overset{|}{NH_2^+}}}-R^{11}-\overset{R^{12}}{\underset{}{\overset{|}{N}}}-R^{11}-\overset{R^{12}}{\underset{R^{14}}{\overset{/}{Si}}}-R^{13}, \text{ and}$$

$$-\overset{Cl^-}{\underset{}{\overset{|}{NH_2^+}}}-R^{11}-\overset{R^{12}}{\underset{}{\overset{|}{N}}}-R^{11}-\overset{OR^{12}}{\underset{OR^{14}}{\overset{/}{Si}}}-OR^{13};$$

in the polar functional group, $R^8$ and $R^{11}$ are the same or different from each other, and each independently linear or branched alkylene having 1 to 20 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; linear or branched alkenylene having 2 to 20 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; linear or branched alkynylene having 3 to 20 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; cycloalkylene having 3 to 12 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; arylene having 6 to 40 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; aralkylene having 7 to 15 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; alkoxylene that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; or carbonyloxylene that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy, and when two or more of $R^8$ or $R^{11}$ are present, they are the same or different from each other;

$R^9$, $R^{12}$, $R^{13}$ and $R^{14}$ are the same or different from each other, and each is independently hydrogen; halogen; linear or branched alkyl having 1 to 20 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; linear or branched alkenyl having 2 to 20 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; linear or branched alkynyl having 3 to 20 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; cycloalkyl having 3 to 12 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; aryl having 6 to 40 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; aralkyl having 7 to 15 carbon atoms that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; alloxy that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy; or carbonyloxy that is substituted or unsubstituted with one or more substituents selected from halogen, alkyl, alkenyl, alkynyl, haloalkyl, haloalkenyl, haloalkynyl, aryl, aralkyl, alkoxy, haloalkoxy, carbonyloxy, halocarbonyloxy, aryloxy, haloaryloxy, silyl and siloxy, and when two or more $R^{12}$ are present, they are the same or different from each other.

2. The method according to claim 1, wherein the antisolvent a) is a hydrocarbon compound having any one structure selected from linear, branched, and cyclic structures having 5 to 20 carbon atoms.

3. The method according to claim 1, wherein the antisolvent a) is any one selected from normal hexane, cyclohexane, and heptane.

4. The method according to claim 1, wherein the antisolvent a) is added in a ratio of 10 to 90% based on the weight of the monomers b).

5. The method according to claim 1, wherein the [Ani] of Formula 2 is selected from the group consisting of borate, aluminate, $[SbF_6]^-$, $[PF_6]^-$, $[AsF_6]^-$, perfluoroacetate ($[CF_3CO_2]^-$), perfluoropropionate ($[C_2F_5CO_2]^-$), perfluorobutyrate ($[CF_3CF_2CF_2CO_2]^-$), perchlorate ($[ClO_4]^-$), p-toluenesulfonate ($[p-CH_3C_6H_4SO_3]^-$, $[SO_3CF_3]^-$, borata benzene, and carborane that is substituted or unsubstituted with halogen.

6. The method according to claim 1, wherein the [Ani] of Formula 2 is an anion represented by the following Formula 2a or Formula 2b:

$$[M'(R^6)_4] \qquad \text{[Formula 2a]}$$

$$[M'(OR^6)_4] \qquad \text{[Formula 2b]}$$

wherein M' is boron or aluminum; $R^6$ is each independently halogen; linear or branched alkyl having 1 to 20 carbon atoms that is substituted or unsubstituted with halogen; linear or branched alkenyl having 2 to 20 carbon atoms that is substituted or unsubstituted with halogen; cycloalkyl having 3 to 12 carbon atoms that is substituted or unsubstituted with halogen; aryl having 6 to 40 carbon atoms that is substituted or unsubstituted with hydrocarbon having 3 to 20 carbon atoms; aryl having 6 to 40 carbon atoms that is substituted with linear or branched trialkylsiloxy having 3 to 20 carbon atoms or linear or branched triarylsiloxy having 18 to 48 carbon atoms; or aralkyl having 7 to 15 carbon atoms that is substituted or unsubstituted with halogen.

7. The method according to claim 1, wherein as the monomers b), a monomer having a boiling point (Tb) of 150° C. or more is used.

8. The method according to claim 1, wherein the antisolvent a), the cyclic olefin-based monomer, and the catalyst mixture are introduced to a reactor, and reacted at a temperature of 50 to 150° C.

9. The method according to claim 1, wherein the polymer is a cyclic olefin-based polymer that is obtained in a solid phase, and the cyclic olefin-based polymer has a weight-average molecular weight (Mw) of 50,000 to 500,000.

10. The method according to claim 1, wherein the polymer has bulk density of 0.2 to 0.5 g/ml.

* * * * *